(12) United States Patent
Levanoni et al.

(10) Patent No.: US 8,997,066 B2
(45) Date of Patent: Mar. 31, 2015

(54) EMULATING POINTERS

(75) Inventors: Yosseff Levanoni, Redmond, WA (US);
Weirong Zhu, Issaquah, WA (US);
Lingli Zhang, Sammamish, WA (US);
John Lee Rapp, Redmond, WA (US);
Andrew L. Bliss, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1117 days.

(21) Appl. No.: 12/979,094

(22) Filed: Dec. 27, 2010

(65) Prior Publication Data
US 2012/0167062 A1 Jun. 28, 2012

(51) Int. Cl.
*G06F 9/45* (2006.01)
*G06F 9/455* (2006.01)

(52) U.S. Cl.
CPC ............... *G06F 9/455* (2013.01); *G06F 8/434* (2013.01)
USPC .......................................................... 717/138

(58) Field of Classification Search
None
See application file for complete search history.

(56) References Cited

U.S. PATENT DOCUMENTS

| | | | |
|---|---|---|---|
| 4,493,027 A | 1/1985 | Katz et al. | |
| 5,809,302 A * | 9/1998 | Wang et al. | 717/117 |
| 6,021,275 A | 2/2000 | Horwat | |
| 6,049,667 A * | 4/2000 | Bates | 717/138 |
| 6,071,317 A | 6/2000 | Nagel | |
| 6,081,665 A | 6/2000 | Nilsen et al. | |
| 6,149,318 A * | 11/2000 | Chase et al. | 717/131 |
| 6,327,701 B2 | 12/2001 | Ungar | |
| 6,343,371 B1 * | 1/2002 | Flanagan et al. | 717/124 |
| 6,502,237 B1 | 12/2002 | Yates et al. | |
| 6,809,732 B2 | 10/2004 | Zatz | |
| 6,901,586 B1 * | 5/2005 | Czajkowski | 717/151 |
| 6,988,264 B2 | 1/2006 | Sarma | |
| 7,111,290 B1 | 9/2006 | Yates et al. | |
| 7,293,261 B1 | 11/2007 | Anderson et al. | |
| 7,600,155 B1 | 10/2009 | Nickolls et al. | |
| 7,836,430 B2 | 11/2010 | Shebs | |
| 7,950,001 B2 | 5/2011 | Panchamukhi et al. | |
| 7,975,260 B1 | 7/2011 | Conover | |
| 8,146,061 B2 | 3/2012 | Xu et al. | |
| 8,166,450 B2 | 4/2012 | Fuhler et al. | |
| 8,261,242 B2 | 9/2012 | Booth et al. | |

(Continued)

FOREIGN PATENT DOCUMENTS

CN 1266513 A 9/2000
WO WO 2008002350 A1 1/2008

OTHER PUBLICATIONS

Engelen et al., "An Efficient Algorithm for Pointer-to-Array Access Conversion for Compiling Optimizing DSP Applications", 2001, Innovative Architecture for Future Generation High-Performance Processors and Systems, 2001, pp. 80-89.*

(Continued)

*Primary Examiner* — Jue Louie
(74) *Attorney, Agent, or Firm* — Kevin Sullivan; Brian Haslam; Micky Minhas

(57) ABSTRACT

The present invention extends to methods, systems, and computer program products for emulating pointers. Pointers can be emulated by replacing the pointers with a <variable#, offset> pair and replacing each dereference site with a switch on the tag and a switch body that executes the emulated pointer access on the corresponding variable the pointer points to. Data flow optimizations can be used to reduce the number of switches and/or reduce the number of cases which need be considered at each emulated pointer access sites.

21 Claims, 3 Drawing Sheets

(56) References Cited

U.S. PATENT DOCUMENTS

| | | | |
|---|---|---|---|
| 8,341,604 | B2 | 12/2012 | Codrescu et al. |
| 8,429,617 | B2 | 4/2013 | Demetriou et al. |
| 8,468,500 | B2 | 6/2013 | Hatabu |
| 2003/0145282 | A1 | 7/2003 | Thomas et al. |
| 2003/0145310 | A1 | 7/2003 | Thames et al. |
| 2003/0163801 | A1 | 8/2003 | Thames et al. |
| 2004/0111707 | A1 | 6/2004 | Bliss |
| 2004/0205747 | A1 | 10/2004 | Bernstein et al. |
| 2004/0268331 | A1 | 12/2004 | Mitchell et al. |
| 2005/0066308 | A1 | 3/2005 | Han |
| 2005/0097399 | A1 | 5/2005 | Bliss et al. |
| 2006/0048098 | A1 | 3/2006 | Gatlin et al. |
| 2006/0069953 | A1 | 3/2006 | Lippet et al. |
| 2006/0082577 | A1 | 4/2006 | Carter |
| 2006/0107250 | A1 | 5/2006 | Tarditi |
| 2007/0018980 | A1 | 1/2007 | Berteig |
| 2007/0250820 | A1 | 10/2007 | Edwards et al. |
| 2007/0271553 | A1 | 11/2007 | Higgins et al. |
| 2009/0006895 | A1 | 1/2009 | May et al. |
| 2009/0150422 | A1 | 6/2009 | Meijer et al. |
| 2009/0164982 | A1 | 6/2009 | Lobo et al. |
| 2009/0282390 | A1 | 11/2009 | Geselowitz |
| 2009/0307667 | A1 | 12/2009 | Booth et al. |
| 2009/0322751 | A1 | 12/2009 | Oneppo |
| 2010/0131934 | A1 | 5/2010 | Kim et al. |
| 2010/0149185 | A1 | 6/2010 | Caperwell |
| 2011/0072309 | A1 | 3/2011 | Sakai et al. |
| 2011/0214109 | A1 | 9/2011 | Pedersen |
| 2012/0159258 | A1 | 6/2012 | Maybee |
| 2012/0317394 | A1 | 12/2012 | Zhu |
| 2013/0007712 | A1 | 1/2013 | Kumar |

OTHER PUBLICATIONS

Franke et al., "Compiler Transformation of Pointers to Explicit Array Accesses in DSP Applications", 2001, CC '01 Proceedings of the 10th International Conference on Compiler Construction, pp. 69-85.*

Xu et al., "A Test Data Generation Tool for Unit Testing of C Programs", 2006, Proceedings of the Sixth International Conference on Quality Software (QSIC'06).*

Venkataramani et al., "MemTracker: An Accelerator for Memory Debugging and Monitoring", Jun. 2009, 33 pages.

Orso et al., "Classifying Data Dependences in the Presence of Pointers for Program Comprehension, Testing, and Debugging", Apr. 2004, 41 pages.

Notice of Allowance dated Oct. 28, 2013 cited in U.S. Appl. No. 12/969,482.

Notice of Allowance dated Nov. 1, 2013 cited in U.S. Appl. No. 13/172,521.

George C. Necula et al., "CIL: Intermediate Language and Tools for Analysis and Transformations for C Programs", 2002 [Retrieved on Feb. 27, 2013] retriefed from the internet: <URL: http://download.springer.com/static/pdf/21/chp%253A10.1007%252F3-540-45937-5_16.pdf?auth66=1363282191_a5b9292a8db54ed128fc73f27ab0ad1b&ext=.pdf> 16 pages.

Office Action dated May 9, 2013 cited in U.S. Appl. No. 12/969,482.

Notice of Allowance dated May 15, 2013 cited in U.S. Appl. No. 13/158,077.

Debug a Vertex Shader, Oct. 11, 2010, (Retrieved date) 6 pages.

DirectX Software Development Kit, Oct. 11, 2010, (Retrieved Date) 4 pages.

D3DXSHADER Flags, Sep. 14, 2010, 4 pages.

Greg Watson, "PTP Design Document", Nov. 10, 2007, 12 pages.

Gregory Pakosz, "How to Debug DirectX 11 Compute Shader?", Dec. 19, 2009, 1 page.

PIX, Oct. 11, 2010 (Retrieved Date), 2 pages.

NVIDIA Parallel Nsight, Sep. 22, 2010, 2 pages.

Appendix B: Debugging and Profiling Parallel Applications, Pub. Date: 2010, 9 pages.

NVIDIA Compute, "PTX: Parallel Thread Execution" ISA Version 1.1, Oct. 24, 2007, 93 pages.

Bleisweiss, Avi, "Shading Compilers", Based on information and belief available, at least as early as Jan. 3, 2011, 22 pages.

Lejdfors, Calle, et al., "PyFX: A Framework for Programming Real-Time Effects", at least as early as Jan. 3, 2011, 12 pages.

opensourceproject.ogr.cn, "Debugging Multiple Tasks", 2007, 5 pages.

Banks, "C Support for Multiple Address Spaces in Embedded Systems", May 31, 2001, 5 pages.

Unix International, "DWARF Debugging Information Format", Jul. 27, 1993, 108 pages.

Watson, Greg, et al., "Relative Debugging for Data-Parallel Programs: A ZPL Case Study", Oct. 2000 IEEE, pp. 42-52.

* cited by examiner

{200}

> Defining An Offset Variable Corresponding To The Tag Variable, The Offset Variable For Storing A Value Used To Identify An Array Position > For Each Location In The Lower Level Code Where An Address Value Is Assigned To A Pointer, Assigning A Value To One Or More Of The A Tag Variable And A Corresponding Offset Variable To Identify A Position Within In One Of The One Or More Arrays Or Global Memory Resources To Emulate Assigning The Address Value To The Pointer > For Each Location In The Lower Level Code Where A Pointer Is Dereferenced, Assigning A Value To A Location In One Of The One Or More The Arrays Or Global Memory Resources Based On The Value Assigned To A Tag Variable And The Value Assigned To A Corresponding Offset Variable To Emulate Dereferencing The Pointer

205 —

> Replacing The Lower Level Instructions Representing Statements And Expressions From The Higher Level Code That Define The Plurality Of Variables And That Assign To Or Dereference Pointers From Among The One Or More Pointers With The Pointer Emulation Instructions

Figure 2
(Continued)

EMULATING POINTERS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

To develop a software application for performing a computing task, a developer typically writes source code (e.g., in C++, Visual Basic, etc.) that expresses the desired functionality of the software application. The source code can then be compiled into executable code (or alternately interpreted at execution time). During source code compilation, a compiler converts source code instructions into machine instructions (e.g., x86 instructions) that are directly executable on a computer system. The executable code is run on a computer system to implement the desired functionality.

In some environments, a single stage compiler is used to compile source code into executable code. For example, a C++ compiler can compile C++ source code directly to executable code that can be run on a processor of a personal computer. In other environments, a multi-stage compiler is used to compile source code into executable code. A multi-stage compiler can include a number of different compile stages. Each compile stage can perform some translation, conversion, etc., to progress toward compiling received source code into machine instructions (e.g., targeted to a specific processor).

In further environments, source code can be translated between various different formats to facilitate subsequent compilation. For example, expressions and statements of a first higher level language can be translated into instructions in a lower-level intermediate format. Subsequently, the instructions in the lower-level intermediate format can be translated into expressions and statements of a second higher level language. The expressions and statements of a second higher level language can then be compiled. Translating between higher level languages permits a developer to develop code for a platform even when the developer has reduced knowledge about the platform.

Ideally, the functionality represented in the expressions and statements of the first higher level language is preserved in the expressions and statements of the second higher level language. However, it may be that the second higher level language lacks directly corresponding functionality. Thus, preserving the functionality of the expressions and functions of first higher level language is more difficult, if even possible at all.

A more specific example includes the targeting of C++ source code to a Graphical Processing Unit ("GPU") language such as, for example, High Level Shader Language ("HLSL") or Open CL source code, for subsequent compilation and execution on a GPU target. The C++ (as well as the C) programming language defines a flat memory model where a pointer can be obtained pointing to objects (or parts of objects). A pointer can be obtained whether an object (or part of an object) resides in a local variable, in a global or static variable, or in a free store, such as, for example, a dynamic heap. Once a pointer is obtained it can be passed between caller functions and callee and manipulated in various ways. For example, a pointer can be referenced to enable indirectly writing or reading from the pointed to location.

However, virtually all GPU programming models either lack pointer support or place restrictions on pointer usage. For example, HLSL lacks support for pointers. Other GPU programming models require a developer to annotate pointer declarations with the type of memory the pointers will be pointing to (and thus know a memory type in advance). In these other GPU programming models, a pointer to global memory has a different type from a pointer to local memory.

These constraints on pointer usage are at least in part related to GPU memory not being fully abstracted. As such, different operations are required to access different types of memory. Further, uniform, non-branching, and coalesced memory access provides performance on a GPU. A programming model that is pointer rich can result in code that yields anti-patterns.

BRIEF SUMMARY

The present invention extends to methods, systems, and computer program products for emulating pointers. A plurality of instructions of lower level code is accessed. The plurality of instructions having been translated from corresponding statements and expressions of higher level code. The plurality of lower level instructions includes lower level instructions representing statements and expressions from the higher level code that define a plurality of different variables. The pluralities of variables include one or more pointers, a set of local variables, a set of shared memory variables, and global memory resources. The plurality of lower level instructions also include instructions representing statements and expressions from the higher level code that assign to or dereference pointers from among the one or more pointers.

The lower level code is altered to emulate the definition and usage of the one or more pointers. The plurality of lower level instructions is inlined into a single function. The single function is configured to provide a processor kernel with direct knowledge of the set of local variables, the set of shared memory variables, and the global memory resources when executed at the processor. Pointer emulation instructions are generated.

The pointer emulation instructions define one or more arrays. The one or more arrays for storing the set of local variables and the set of shared variables. The pointer emulation instructions assign each local variable and each shared variable to a position in one of the one or more arrays. The pointer emulation instructions represent each of the one or more pointers by defining a pair of variables, a tag variable and an offset variable. The tag variable is for storing a value used to identify one of the one or more arrays or global memory resource the emulated pointer is pointing into. The offset variable corresponds to the tag variable and is for storing a value used to identify an array position.

For each location in the lower level code where an address value is assigned to a pointer, the pointer emulation instructions assign a value to one or more of the a tag variable and a corresponding offset variable. Assignment of a value to the tag variable and/or offset variable identifies a position within one of the one or more arrays or global memory resources to emulate assigning the address value to the pointer. For each location in the lower level code where a pointer is dereferenced, the pointer emulation instructions assign/read a value to/from a location in one of the one or more the arrays or global memory resources. Assigning/reading a value to/from a location is based on the value assigned to a tag variable and the value assigned to a corresponding offset variable to emulate dereferencing the pointer.

The lower level instructions representing statements and expressions from the higher level code that define the plurality of variables and that assign to or dereference pointers from among the one or more pointers are replaced with the pointer emulation instructions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
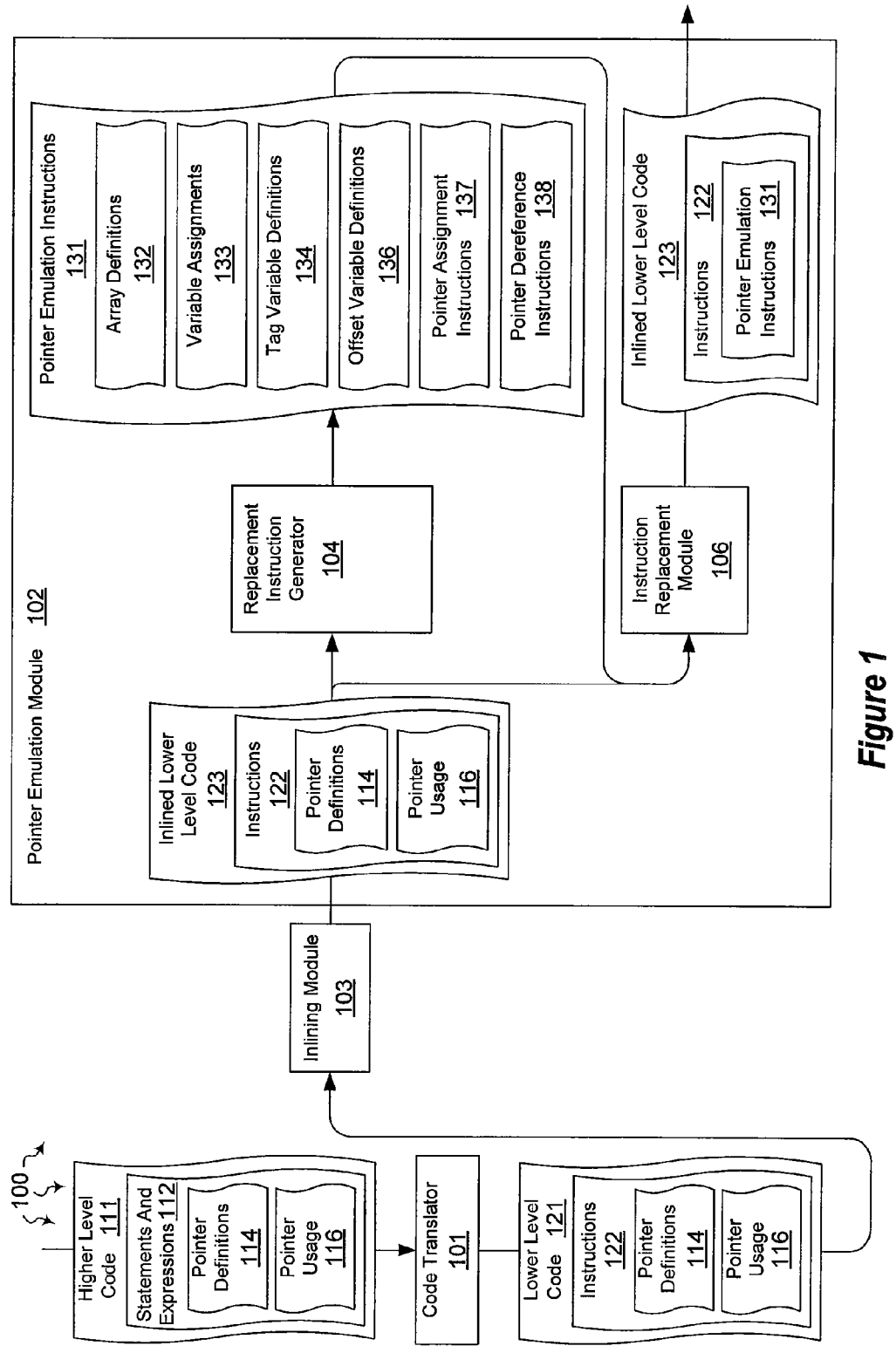
FIG. 1 illustrates an example computer architecture that facilitates emulating pointers.

The present invention extends to methods, systems, and computer program products for emulating pointers. A plurality of instructions of lower level code is accessed. The plurality of instructions having been translated from corresponding statements and expressions of higher level code. The plurality of lower level instructions includes lower level instructions representing statements and expressions from the higher level code that define a plurality of different variables. The pluralities of variables include one or more pointers, a set of local variables, a set of shared memory variables, and global memory resources. The plurality of lower level instructions also include instructions representing statements and expressions from the higher level code that assign to or dereference pointers from among the one or more pointers.

The lower level code is altered to emulate the definitions and usage of the one or more pointers. The plurality of lower level instructions is inlined into a single function. The single function is configured to provide a processor kernel with direct knowledge of the set of local variables, the set of shared memory variables, and the global memory resources when executed at the processor. Pointer emulation instructions are generated.

The pointer emulation instructions define one or more arrays. The one or more arrays for storing the set of local variables and the set of shared variables. The pointer emulation instructions assign each local variable and each shared variable to a position in one of the one or more arrays. The pointer emulation instructions represent each of the one or more pointers by defining a pair of variables, a tag variable and an offset variable. The tag variable is for storing a value used to identify one of the one or more arrays or global memory resource the emulated pointer is pointing into. The offset variable corresponds to the tag variable and is for storing a value used to identify an array position.

For each location in the lower level code where an address value is assigned to a pointer, the pointer emulation instructions assign a value to one or more of the a tag variable and a corresponding offset variable. Assignment of a value to the tag variable and/or offset variable identifies a position within one of the one or more arrays or global memory resources to emulate assigning the address value to the pointer. For each location in the lower level code where a pointer is dereferenced, the pointer emulation instructions assign/read a value to/from a location in one of the one or more the arrays or global memory resources. Assigning/reading a value to/from a location is based on the value assigned to a tag variable and the value assigned to a corresponding offset variable to emulate dereferencing the pointer.

The lower level instructions representing statements and expressions from the higher level code that define the plurality of variables and that that assign to or dereference pointers from among the one or more pointers are replaced with the pointer emulation instructions.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD, or other optical disk storage, magnetic disk storage or other magnetic storage devices, or any other medium which can be used to store desired program code means (software) in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates pointer emulation. Referring to FIG. 1, computer architecture 100 includes code translator 101, inlining module 103, and pointer emulation module 102. Each of the depicted components can be connected to one another over (or can be part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In general, code translator 101 is configured to translate (e.g., compile) expressions and statements of higher level code (of a first format) into instructions of lower level code. The higher level code can be in a general purpose programming language, such as, for example, C++, Visual Basic, etc. The lower level code can be an intermediate representation ("IR") of the higher level code that captures appropriate information about the expressions and statements of higher level code (of the first format). A Control Flow Graph ("CFG") capturing the control flow of the expressions and statements of higher level code (of the first format) can also be generated.

Inlining module 103 is configured to inline all methods which are to be called by a kernel into a single function. The single function provides the kernel with static knowledge (or compile-time knowledge) of shared and local variables and global memory resources transitively declared and used by the kernel. In some embodiments, inlining module 103 is included in or is part of pointer emulation module 102.

In general, pointer emulation module 102 is configured to replace lower level code (IR instructions) defining and using pointers with other lower level code (other IR instructions) emulating the definition and use of pointers. As depicted, pointer emulation module 102 includes replacement instruction generator 104 and instruction replacement module 106.

Replacement instruction generator 104 is configured to generate replacement emulation instructions for pointer definitions and pointer usage. Replacement instruction generator 104 can receive inlined lower level code (e.g., IR instructions) containing pointer definitions and pointer usage. Replacement instruction generator 104 can generate pointer emulation instructions (e.g., emulation IR instructions) to emulate the pointer definitions and pointer usage. Pointer emulation instructions can include array definitions, variable assignments, tag variable definitions, offset variable definitions, pointer definition instructions, pointer assignment instructions, and pointer dereference instructions.

Instruction replacement module 106 is configured to replace pointer definitions and pointer usage with pointer emulation instructions. Instruction replacement module 106 can receive inlined lower level code and pointer emulation instructions. The inlined lower level code can contain pointer definitions and pointer usage. Instruction replacement module 106 can replace the pointer definitions, assignments, and dereference instructions with the pointer emulation instructions within the inlined lower level code.

Inlined lower level code containing pointer emulation instructions can then be further translated or compiled into other code formats. In some embodiments, inlined lower level code is translated into expressions and states of higher level code (of the same or different format as used to generate the lower level code). For example, inlined IR instructions can be translated into High Level Shader Language ("HLSL") of DirectX ("DX"), C++, Visual Basic, etc. In other embodiments, inlined lower level code is compiled. For example, inlined IR instructions can be compiled into HLSL bytecode.

Figure 2:
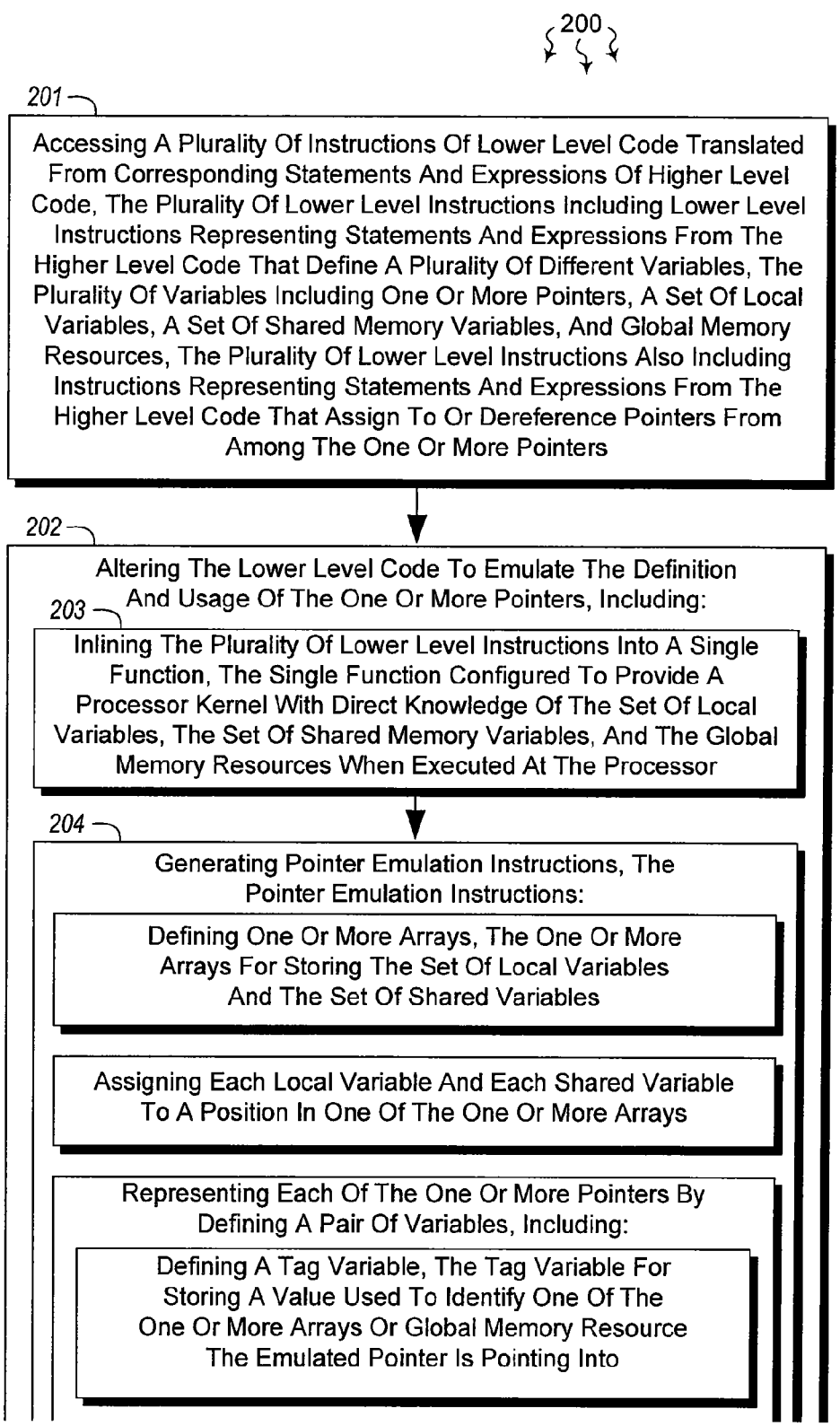
FIG. 2 illustrates a flow chart of an example method for emulating pointers.

FIG. 2 illustrates a flow chart of an example method 200 for emulating pointers. Method 200 will be described with respect to the components and data of computer architecture 100.

Code translator 101 can access higher level code 111 (e.g., DPC++ source code). Higher level code 111 includes statements and expressions 112 representing pointer definitions 114 and pointer usage 116. A pointer definition can include a statement in a higher level language defining a pointer, such as, for example, "int *p;". Pointer usage can include a statement in a higher level language assigning a pointer, such as, for example, "p=&a;" (assign the address of variable "a" to the pointer variable "p") as well as instructions dereferencing a pointer, such as, for example, "*p=8;" (locate the address p refers to in memory and set the location being addressed to 8). Code translator 101 can translate higher level code 111 into lower level code 121 (e.g., an IR). Although in a different format, lower level code 121 includes instructions 122 representing pointer definitions 114 and pointer usage 116.

Method 200 includes an act of accessing a plurality of instructions of lower level code translated from corresponding statements and expressions of higher level code, the plurality of lower level instructions including lower level instructions representing statements and expressions from the higher level code that define a plurality of different variables, the plurality of variables including one or more pointers, a set of local variables, a set of shared memory variables, and global memory resources, the plurality of lower level instructions also including instructions representing statements and expressions from the higher level code that assign to or dereference pointers from among the one or more pointers (act 201). For example, pointer emulation module 102 can access lower level code 121. Lower level code 121 includes instructions 122 translated from statements and expressions 112. Instructions 122 include lower level instructions representing a plurality of variable definitions from statements and expressions 112. The plurality of defined variables includes one or more pointers (e.g., pointer definitions 114), a set of local variables, a set of shared memory variables, and global resources. Instructions 122 include lower level instructions representing assigning to and/or dereferencing pointers from among the one or more pointers (e.g., pointer usage 116).

Method 200 includes an act of altering the lower level code to emulate the definition, assignment to, and dereferencing of the one or more pointers (act 202). For example, pointer emulation module 102 can access lower level code 121. Pointer emulation module 102 can alter lower level code 121 to emulate pointer definitions 114 and pointer usage 116. Pointer usage 116 can include assigning values to and dereferencing pointers. Emulating pointer definitions, pointer assignments, and pointer dereferencing can be implemented without using pointer features of higher level code 111.

Act 202 includes an act of inlining the plurality of lower level instructions into a single function, the single function configured to provide a processor kernel with direct knowledge of the set of local variables, the set of shared memory variables, and the global memory resources when executed at the processor (act 203). For example, inlining module 103 can access lower level code 121. Inlining module 103 can inline lower level code 121 into inlined lower level code 123. Inlined lower level code 123 can be a single function. The single function can provide a processor (e.g., GPU) kernel with direct knowledge of the set of local variables, the set of shared memory variables, and the global memory resources represented in statements and expressions 112.

Act 202 includes an act of generating pointer emulation instructions (act 204). For example, replacement instruction generator 104 can access instructions 122, including pointer definitions 114 and pointer usage 116. Replacement instruction generator 104 can generate pointer emulation instructions 131 for emulating pointer definitions 114 and pointer usage 116 (e.g., without using pointer features of higher level code 111).

Generating pointer emulation instructions 131 can include defining one or more arrays, the one or more arrays for storing the set of local variables and the set of shared variables. In general, arrays can be used to map to memory that is not otherwise directly indexable. For example, replacement instruction generator 104 can generate array definitions 132. Array definitions 132 can define one or more arrays for storing the set of local variables and the set of shared variables defined in statements and expressions 112. When appropriate, an array can also be defined for global variables.

In some embodiments, one array is defined for the set of local variables and one array is defined for the set of shared memory variables. In other embodiments, two or more arrays are defined for the set of local variables. For example, a first local array can be defined for local variables that are dereferenced using a known (e.g., compile-time) offset. A second local array can be defined for other local variables. Likewise, two or more arrays can be defined for the set of shared memory variables. For example, a first shared memory array can be defined for shared memory variables that are dereferenced using a known offset. A second shared memory array can be defined for other shared memory variables.

In further embodiments, a unique array is defined for each local variable and for each shared memory variable. Various combinations of array definitions are also possible. For example, a shared memory array can be defined for shared memory variables, a local array can be defined for local variables that are dereferenced using known offsets, or a unique local array defined for each other local variables.

Generating pointer emulation instructions 131 can include assigning each local variable and each shared variable to a position in one of the one or more arrays. For example, replacement instruction generator 104 can generate variable assignments 133. Variable assignments 133 assign each local variable and each shared memory variable to a position in one of the arrays defined by array definitions 132. Assignment to an array can include assignment to an array shared with other variables or assignment to a unique array for a variable.

In general, a pair of variables can be defined to represent a pointer. Generating pointer emulation instructions 131 can include representing each of the one or more pointers by defining a pair of variables. Defining a pair of variables can include defining a tag variable, the tag variable for storing a value used to identify one of the one or more arrays or global memory resource the emulated pointer is pointing into. For example, replacement instruction generator 104 can generate tag variable definitions 134. Tag variable definitions 134 define tag variables for storing values used to identify arrays defined by array definitions 132.

Defining a pair of variables can also include defining an offset variable corresponding to the tag variable, the offset variable for storing a value used to identify an array position. For example, replacement instruction generator 104 can generate tag offset variable definitions 136. Offset variable definitions 136 define offset variables for storing values used to identify positions within the arrays defined by array definitions 132.

Generating pointer emulation instructions 131 can include for each location in the lower level code where an address value is assigned to a pointer, assigning a value to one or more of the a tag variable and a corresponding offset variable to identify a position within in one of the one or more arrays or global memory resources to emulate assigning the address value to the pointer. For example, replacement instruction generator 104 can generate pointer assignment instructions 137. For each location in instructions 122 where an address value is assigned to a pointer, pointer assignment instructions 137 assigns a value to a tag variable and/or offset variable to identity a position in an array defined by array definitions 132.

Generating pointer emulation instructions 131 can include for each location in the lower level code where a pointer is dereferenced, assigning/reading a value to/from a location in one of the one or more the arrays or global memory resources based on the value assigned to a tag variable and the value assigned to a corresponding offset variable to emulate dereferencing the pointer. For example, replacement instruction generator 104 can generate pointer dereference instructions 138. For each location in instructions 122 where a pointer is dereferenced, pointer dereference instructions 138 assign a value to a location in one of the arrays defined in array definitions 132 based on the value of a tag variable defined in tag variable definitions 134 and the value of an offset variable defined in offset variable definitions 136.

Act 202 includes an act of replacing the lower level instructions representing statements and expressions from the higher level code that define the plurality of variables and that assign to or dereference pointers from among the one or more pointers with the pointer emulation instructions (act 205). For example, instruction replacement module 106 can access inline lower level code 123 and pointer emulation instructions 131. Instruction replacement module 106 can replace pointer definitions 114 and pointer usage 116 with pointer emulation instructions 131. Pointer emulation module 102 can output inlined lower level code 123 for further processing, such as, for example, translation into HLSL source code or compilation in to HLSL bytecode.

Emulation code can be used to emulate any number of other pointer operations including: pointer arithmetic, pointer comparison (e.g., '==', '>', etc.) and casting between different pointer types (e.g., int * to float *).

Embodiments of the invention can be used to emulate pointers defined and used in a number of different source code languages. For example, embodiments of the invention include accessing Data Parallel C++ ("DPC++") source code. The DPC++ source code can include expressions and statements defining and using (e.g., assigning to and dereferencing) one or more pointers. The DPC++ source code is translated into IR instructions. The IR instructions represent the pointer definitions and pointer usage from the DPC++ source code. The IR instructions are inlined into a single function.

Pointer emulation instructions are generated to emulate the pointer definitions and pointer usage from the DPC++ source code. The pointer emulation instructions are consistent with the pointer definitions and pointer usage from the DPC++ source code (but do not actually define or use pointers from the DPC++ feature set). The pointer emulation instructions are inserted into the inlined IR instructions replacing the pointer definitions and pointer usage from the DPC++ source code. The inlined IR instructions containing the pointer emulation instructions can then be translated into HLSL source code and/or compiled into HLSL byte code. HLSL byte code based on the IR instructions containing the pointer emulation instructions can be executed in Graphic Processing Unit ("GPU") environments that lack pointer support or restrict pointer usage.

For example, in the code fragment:

```
int a=0, b=0;
int *p;
if (some_condition) { p = &a; }
else { p = &b; }
*p = 17;
``` the following first emulation code can be generated mapping 'a' and 'b' into a single array 'L':

```
int L[2];
L[0] = 0; // emulate a = 0
L[1] = 0; // emulate b = 0
int p_offset, p_tag;
if (some_condition) { p_tag=0; p_offset=0; }
else { p_tag=0; p_offset=1; }
switch (p_tag) {
    case 0:
        L[p_offset] = 17;
        break;
    // More cases handling tags other than 0 which represents L
}
```

In general, data flow analysis statically identifies that some tag values are never assigned to a tag variable at a dereference emulation instruction. Thus, data flow analysis can be used to identify that a set of possible values for a tag variable is trimmed or identify that a value for a tag variable is constant at all points it is referenced. Data flow analysis on the first emulation code, data flow analysis identifies possible values for p_tag and p_offset. From the data flow analysis of the first emulation code, it is identified that p_tag is a constant 0 when it is referenced.

In response to data flow analysis, dead code can be trimmed to optimize execution. For example, can code can be trimmed form the first emulation code resulting in optimized first emulation code:

```
int L[2];
L[0] = 0; // emulate a = 0
L[1] = 0; // emulate b = 0
int p_offset;
if (some_condition) { p_offset=0; }
else { p_offset=1; }
L[p_offset] = 17;
```

Alternately, second emulation code mapping 'a' and 'b' into a two separate arrays can be generated:

```
int L_a[1], L_b[1];
L_a[0] = 0; // emulate a = 0
L_b[0] = 0; // emulate b = 0
int p_tag;
if (some_condition) { p_tag=0; }
else { p_tag=1; }
switch (p_tag) {
case 0: L_a[0] = 17; break;
case 1: L_b[0] = 17; break;
}
```

The first optimized emulation code does not include branching in the switch. As such, the first optimized emulation code can be targeted to GPUs that handle branching code less efficiently. On the other hand, in the second emulation code, distinct variables with fixed offsets are accessed and thus cannot be aliased to each other. Use of fixed offsets permits a compiler to disambiguate the access under the switch.

In some embodiments, the selected number of variables included in emulation code is balanced based on compiler capabilities and runtime characteristics of a target (e.g., GPU) environment. Fewer target variable results in less branchy code. More target variables are more amenable to further compiler optimizations.

Offsets can be known prior to generating emulations code. For example, in the second code fragment:

```
int a[4];
int b[5];
int c[3];
int * p1 = &a;
int * p2 = &b[1];
int * p3 = &c[x]; // value of x is
                  // unknown at compile time
p1 = p1 + y; // value of y is
             // unknown at compile time
*p1 = 10;
``` the following third emulation code can be generated:

```
// use a single array to emulate a,b,c
int local[12]; // tag "1"
// compile-time known
int p1_tag = 1, p1_offset = 0;
// compile-time known
int p2_tag = 1, p2_offset = 4 + 1;
// compile-time unknown
int p3_tag = 1, p3_offset = 9 + x;
// compile-time unknown
p1_offset = p1_offset + y;
// compile-time unknown offset
local[p1_offset] = 10;
```

Embodiments of the invention can fully inline a GPU kernel such that the GPU kernel results in a single function contains a finite and well-known set of local variables, shared memory variables, and global memory resources. Pointers can be emulated by replacing the pointers with a <variable#, offset> pair and replacing each dereference site with a switch on the tag and a switch body that executes the emulated pointer access on the corresponding variable the pointer points to. Data flow optimizations can be used to reduce the number of switches and/or reduce the number of cases which need be considered at each emulated pointer access sites.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for emulating pointers, the method comprising:
   an act of accessing a plurality of lower level instructions of lower level code translated from corresponding statements and expressions of higher level code, the plurality of lower level instructions including lower level instructions representing statements and expressions from the higher level code that define a plurality of different variables, the plurality of variables including one or more pointers, a set of local variables, a set of shared memory variables, and global memory resources, the plurality of lower level instructions also including instructions representing statements and expressions from the higher level code that assign to or dereference pointers from among the one or more pointers;
   an act of altering the lower level code to emulate definition and usage of the one or more pointers, including:
      an act of inlining the plurality of lower level instructions into a single function, the single function configured to provide a processor kernel with direct knowledge of the set of local variables, the set of shared memory variables, and the global memory resources when executed at the processor;
      an act of generating lower level pointer emulation instructions, the lower level pointer emulation instructions:
         defining one or more arrays, the one or more arrays for storing the set of local variables and the set of shared variables;
         assigning each local variable in the set of local variables and each shared variable in the set of shared variables to a position in one of the one or more arrays;
         representing each of the one or more pointers by defining a pair of variables, including:
            defining a tag variable, the tag variable for storing a tag value used to identify one of the one or more arrays or global memory resources, the emulated pointer is pointing into; and
            defining an offset variable corresponding to the tag variable, the offset variable for storing an offset value used to identify a position within one of the one or more arrays or global memory resources;
         for each location in the lower level code where an address value is assigned to a pointer, assigning one or more of the tag value to the tag variable and the offset value to the offset variable corresponding to the tag variable to identify a position within the one of the one or more arrays or global memory resources to emulate assigning the address value to the pointer;
         for each location in the lower level code where a pointer is dereferenced, assigning a value to a location in one of the one or more of the arrays or global memory resources based on the one or more of the tag value and the offset to emulate dereferencing the pointer; and
      an act of replacing the inlined lower level instructions representing statements and expressions from the higher level code that define at least the one or more pointers and that assign to or dereference pointers from among the one or more pointers with the lower level pointer emulation instructions.

2. The method as recited in claim 1, wherein the act of generating lower level pointer emulation instructions defining one or more arrays comprises an act of generating lower level instructions defining a local array and a shared memory array, the local array for storing the set of local variables, the shared memory array for storing the set of shared memory variables.

3. The method as recited in claim 2, wherein the act of generating lower level pointer emulation instructions assigning each local variable in the set of local variables and each shared memory variable in the set of shared memory variables to a position in one of the one or more arrays comprises an act of generating lower level instructions assigning the set of local variables into the local array and assigning the set of shared memory variables into the shared memory array.

4. The method as recited in claim 1, wherein the act of generating lower level pointer emulation instructions defining one or more arrays comprises an act of generating lower level instructions defining a first local array and a second local array, the first local array for storing local variables from the set of local variables that are dereferenced using known offsets, the second local array for storing other local variables from the set of local variables.

5. The method as recited in claim 4, wherein the act of generating lower level pointer emulation instructions assigning each local variable in the set of local variables and each shared memory variable in the set of shared memory variables to a position in one of the one or more arrays comprises an act of generating lower level instructions assigning the local variables from the set of local variables that are dereferenced using known offsets into the first local array and assigning the other local variables from the set of local variables into the second local array.

6. The method as recited in claim 1, wherein the act of generating lower level pointer emulation instructions defining one or more arrays comprises an act of generating lower level instructions defining a first shared memory array and a second shared memory array, the first shared memory array for storing shared memory variables from the set of shared memory variables that are dereferenced using known offsets, the second shared memory array for storing other shared memory variables from the set of shared memory variables.

7. The method as recited in claim 1, wherein the act of generating lower level pointer emulation instructions defining one or more arrays comprises an act of generating lower level instructions defining a unique local array for each local variable in the set of local variables and a unique shared memory array for each shared memory variable in the set of share memory variables.

8. The method as recited in claim 1, wherein the act of generating lower level pointer emulation instructions defining one or more arrays comprises an act of generating lower level instructions defining a shared memory array for the set of shared memory variables and a unique local array for each local variable in the set of local variables.

9. The method as recited in claim 1, wherein the act of generating lower level pointer emulation instructions defining one or more arrays comprises an act of generating lower level instructions defining a shared memory array for the set of shared memory variables, a local array for all local variables in the set of local variables that are dereferenced using known offsets, and a unique local array for each of other local variables in the set of local variables.

10. The method as recited in claim 1, wherein assigning a value to a location in one of the one or more of the arrays or global memory resources based on the value assigned to a tag variable and the value assigned to the offset variable corresponding to the tag variable to emulate dereferencing the pointer comprises an act of generating an switch statement structure that switches on tag values of one or more of tag variables defined by the tag variable definitions and on offset values of one or more of the offset variables defined by the offset variable definitions.

11. The method as recited in claim 10, further comprising:
an act of performing data flow analysis on the generated pointer emulation instructions;
an act of statically identifying that some tag values are never assigned to a tag variable at a dereference emulation instruction; and
an act of optimizing the switch statement structure by removing at least one switch case from the switch statement structure.

12. The method as recited in claim 11, wherein the act of statically identifying that some tag values are never assigned comprises one of: identifying that a set of possible tag values for a tag variable is trimmed or identifying that tag value for a tag variable is constant at all points it is referenced.

13. A computer program product for use at a computer system, the computer program product for implementing a method for emulating pointers, the computer program comprising one or more computer hardware storage devices having stored thereon computer-executable instructions that, when executed at a processor, cause the computer system to perform the method, including the following:
access a plurality of lower level instructions of lower level code translated from corresponding statements and expressions of higher level code, the plurality of lower level instructions including lower level instructions representing statements and expressions from the higher level code that define a plurality of different variables, the plurality of variables including one or more pointers, a set of local variables, a set of shared memory variables, and global memory resources, the plurality of lower level instructions also including instructions representing statements and expressions from the higher level code that assign to or dereference pointers from among the one or more pointers;
alter the lower level code to emulate definition and usage of the one or more pointers, including:
inlining the plurality of lower level instructions into a single function, the single function configured to provide a processor kernel with direct knowledge of the set of local variables, the set of shared memory variables, and the global memory resources when executed at the processor;
generating lower level pointer emulation instructions, the lower level pointer emulation instructions:
defining one or more arrays, the one or more arrays for storing the set of local variables and the set of shared variables;
assigning each local variable in the set of local variables and each shared variable in the set of shared variables to a position in one of the one or more arrays;
representing each of the one or more pointers by defining a pair of variables, including:
defining a tag variable, the tag variable for storing a tag value used to identify one of the one or more arrays or global memory resources, the emulated pointer is pointing into; and
defining an offset variable corresponding to the tag variable, the offset variable for storing an offset value used to identify a position within one of the one or more arrays or global memory resources;
for each location in the lower level code where an address value is assigned to a pointer, assigning one or more of the tag value to the tag variable and the offset value to the offset variable corresponding to the tag variable to identify a position within the one of the one or more arrays or global memory resources to emulate assigning the address value to the pointer;
for each location in the lower level code where a pointer is dereferenced, assigning a value to a location in one of the one or more of the arrays or global memory resources based on the one or more of the tag value and the offset value to emulate dereferencing the pointer; and
replace the inlined lower level instructions representing statements and expressions from the higher level code that define at least the one or more pointers and that assign to or dereference pointers from among the one or more pointers with the lower level pointer emulation instructions.

14. The computer program product of claim 13, wherein computer-executable instructions that, when executed, cause the computer system to define the one or more arrays comprise computer-executable instructions that, when executed, cause the computer system to balance a number of defined arrays based on compiler capabilities and runtime characteristics of a target Graphical Processing Unit ("GPU") environment.

15. The computer program product of claim 13, wherein computer-executable instructions that, when executed, cause the computer system to define the one or more arrays comprise computer-executable instructions that, when executed, cause the computer system to create at least one array for grouping variables that are dereferenced using known offsets.

16. The computer program product of claim 13, wherein computer-executable instructions that, when executed, cause the computer system to assign a value to a location in one of the one or more of the arrays or global memory resources based on the tag value and the offset value to emulate dereferencing the pointer comprise computer-executable instructions that, when executed, cause the computer system to generate a switch statement structure that switches on tag values of one or more of tag variables defined by the tag variable definitions and on offset values of one or more of the offset variables defined by the offset variable definitions.

17. The computer program product of claim 16, further comprising computer-executable instructions that, when executed, cause the computer system to:
perform data flow analysis on the generated pointer emulation instructions;
statically identify that some tag values are never assigned to a tag variable at a dereference emulation instruction; and
optimize the switch statement structure by removing at least one switch case from the switch statement structure.

18. At a computer system including one or more processors and system memory, a method for emulating C++ pointers, the method comprising:
an act of accessing an intermediate representation of C++ source code, the intermediate representation including lower level instructions representing statements and expressions from C++ source code that define a plurality of different variables, the plurality of variables including one or more pointers, a set of local variables, a set of shared memory variables, and global memory resources, the intermediate representation also including lower level instructions representing statements and expressions from C++ source code that assign to or dereference pointers from among the one or more pointers;
an act of altering the intermediate representation to emulate the definition and usage of the one or more pointers, including:
an act of inlining intermediate representation into a single function, the single function configured to provide a processor kernel with direct knowledge of the set of local variables, the set of shared memory variables, and the global memory resources when executed at the processor;
an act of generating lower level pointer emulation instructions, the pointer emulation instructions:
defining one or more arrays, the one or more arrays for storing the set of local variables and the set of shared variables;
assigning each local variable in the set of local variables and each shared variable in the set of shared variables to a position in one of the one or more arrays;
representing each of the one or more pointers by defining a pair of variables, including:
defining a tag variable, the tag variable for storing a tag value used to identify one of the one or more arrays or global memory resources, the emulated pointer is pointing into; and
defining an offset variable corresponding to the tag variable, the offset variable for storing an offset value used to identify a position within one of the one or more arrays or global memory resources;
for each location in the lower level code where an address value is assigned to a pointer, assigning one or more of the tag value to the tag variable and the offset value to the offset variable corresponding to the tag variable to identify a position within the one of the one or more arrays or global memory resources to emulate assigning the address value to the pointer;
for each location in the lower level code where a pointer is dereferenced, assigning a value to a location in one of the one or more of the arrays or global memory resources based on the one or more of the tag value and the offset value to emulate dereferencing the pointer; and
an act of replacing the inlined lower level instructions representing statements and expressions from the C++ source code that define at least the one or more pointers and that assign to or dereference pointers from among the one or more pointers with the lower level pointer emulation instructions.

19. The method as recited in claim 18, further comprising subsequent to replacing the lower level instructions with the pointer emulation instructions, an act of translating the intermediate representation, including the pointer emulation instructions, into High Level Shader Language ("HLSL") source code.

20. The method as recited in claim 18, further comprising subsequent to replacing the lower level instructions with the pointer emulation instructions, an act of compiling the intermediate representation, including the pointer emulation instructions, into High Level Shader Language ("HLSL") byte code for execution on a Graphical Processing Unit ("GPU").

21. A computer program product for use at a computer system, the computer program product for implementing a method for emulating pointers, the computer program comprising one or more computer hardware storage devices having stored thereon computer-executable instructions that, when executed at a processor, cause the computer system to perform the following:
accessing a plurality of lower level instructions of lower level code translated from corresponding statements and expressions of higher level code, the plurality of lower level instructions including lower level instructions representing statements and expressions from the higher level code that define a plurality of different variables, the plurality of variables including one or more pointers, a set of local variables, a set of shared memory variables, and global memory resources, the plurality of lower level instructions also including instructions representing statements and expressions from the higher level code that assign to or dereference pointers from among the one or more pointers;
inlining the plurality of lower level instructions into a single function, the single function configured to provide a processor kernel with direct knowledge of the set of local variables, the set of shared memory variables, and the global memory resources when executed at the processor;

generating lower level pointer emulation instructions, the lower level pointer emulation instructions representing each of the one or more pointers by at least defining a tag variable for storing a tag value to identify an array or a global memory resource and an offset variable for storing an offset value to identify a position within the array or global memory resource which are useable to either emulate assigning an address value to one of the one or more pointers or to emulate dereferencing the one or more pointers; and replacing the inlined lower level instructions representing statements and expressions from the higher level code that define at least the one or more pointers and that assign to or dereference pointers from among the one or more pointers with the lower level pointer emulation instructions.

* * * * *